United States Patent
Beaudette

(10) Patent No.: US 6,823,503 B2
(45) Date of Patent: Nov. 23, 2004

(54) METHOD AND APPARATUS FOR CREATING A PHASE-SHIFTING MASK FOR A PHOTOLITHOGRAPHIC PROCESS

(75) Inventor: Kevin A. Beaudette, Ottawa (CA)

(73) Assignee: Numerical Technologies, Inc., Mountain View, CA (US)

( * ) Notice: Subject to any disclaimer, the term of this patent is extended or adjusted under 35 U.S.C. 154(b) by 81 days.

(21) Appl. No.: 10/334,566

(22) Filed: Dec. 31, 2002

(65) Prior Publication Data

US 2004/0128642 A1 Jul. 1, 2004

(51) Int. Cl.$^7$ ............................................. G06F 17/50
(52) U.S. Cl. ............................ 716/19; 716/20; 716/21; 430/5
(58) Field of Search ............................ 716/4–5, 19–21; 430/5

(56) References Cited

U.S. PATENT DOCUMENTS

| | | | | |
|---|---|---|---|---|
| 6,505,327 B2 | * | 1/2003 | Lin | 716/5 |
| 6,523,165 B2 | * | 2/2003 | Liu et al. | 716/21 |
| 6,560,766 B2 | * | 5/2003 | Pierrat et al. | 716/9 |
| 6,584,610 B1 | * | 6/2003 | Wu et al. | 716/19 |
| 6,609,245 B2 | * | 8/2003 | Liebmann et al. | 716/21 |
| 6,622,288 B1 | * | 9/2003 | Wang et al. | 716/2 |
| 6,721,928 B2 | * | 4/2004 | Pierrat et al. | 716/4 |
| 2004/0068712 A1 | * | 4/2004 | Heng et al. | 716/21 |

OTHER PUBLICATIONS

Publication entitled "Subwavelength Optical Lithography: Challeges and Impact on Physical Design," by A.B. Kahng et al., proceedings of 1999 International Symposium on Physical Design, Monterey, CA, Apr. 12–14, 1999.

\* cited by examiner

Primary Examiner—Vuthe Siek
(74) Attorney, Agent, or Firm—Park, Vaughan & Fleming

(57) ABSTRACT

One embodiment of the invention provides a system that creates a phase-shifting mask for a photolithographic process used in fabricating an integrated circuit. The system starts by receiving a layout for the integrated circuit. The system then associates nodes with features in the layout, and generates arcs between the nodes. Next, the system generates a coloring for the nodes using two colors. The system then generates phase shifters for the phase-shifting mask and assigns different phases to the phase shifters based upon the coloring of the nodes.

25 Claims, 4 Drawing Sheets

METHOD AND APPARATUS FOR CREATING A PHASE-SHIFTING MASK FOR A PHOTOLITHOGRAPHIC PROCESS

BACKGROUND

1. Field of the Invention

The invention relates to the process of fabricating integrated circuits. More specifically, the invention relates to a method and an apparatus for creating a phase-shifting mask for a photolithographic process used in fabricating integrated circuits.

2. Related Art

Recent advances in integrated circuit technology have largely been accomplished by decreasing the feature size of circuit elements on a semiconductor chip. As the feature size of these circuit elements continues to decrease, circuit designers are forced to deal with problems that arise as a consequence of the optical lithography process that is typically used to manufacture integrated circuits. This optical lithography process begins with the formation of a photoresist layer on the surface of a semiconductor wafer. A mask composed of opaque regions, which are generally formed of chrome, and light-transmissive clear regions, which are generally formed of quartz, is then positioned over this photoresist layer. (Note that the term "mask" as used in this specification is meant to include the term "reticle.") Light is then shone on the mask from a visible light source, an ultraviolet light source, or more generally some type of electromagnetic radiation source together with suitably adapted masks and lithography equipment.

This image is reduced and focused through an optical system containing a number of lenses, filters, and mirrors. The light passes through the clear regions of the mask and exposes the underlying photoresist layer. At the same time, opaque regions of the mask block the light leaving underlying portions of the photoresist layer unexposed.

The exposed photoresist layer is then developed, through chemical removal of either the exposed or non-exposed regions of the photoresist layer. The end result is a semiconductor wafer with a photoresist layer having a desired pattern. This pattern can then be used for etching underlying regions of the wafer.

As integration densities continue to increase, it is becoming necessary to use phase shifters to define more and more features within a layout. However, as phase shifters are used to define more features within a layout, it is becoming increasingly common for phase conflicts to occur between the shifters. Note that a pair of phase shifters used to create a critical dimension feature are generally required to have opposite phase. It is hard to satisfy this constraint if critical dimension features are packed so closely together so that their respective phase shifters merge or overlap.

The problem of assigning phases to phase shifters is generally solved by first placing the phase shifters on the phase shifting mask, and then attempting to "color" the phase shifters with two colors, a first color for zero-degree phase shifters, and a second color for 180-degree phase shifter. The coloring process is successful if all of the phase shifters can be colored without creating conflicts between adjacent phase shifters. Otherwise, if the coloring process is not successful, the layout is modified and/or the phase shifters are modified and the coloring process is repeated. This coloring process and the associated modifications to the layout and/or the phase shifters is an extremely time-consuming process.

What is needed is a method and an apparatus for generating a phase-shifting mask without the problems described above.

SUMMARY

One embodiment of the invention provides a system that creates a phase-shifting mask for a photolithographic process used in fabricating an integrated circuit. The system starts by receiving a layout for the integrated circuit. The system then associates nodes with features in the layout, and generates arcs between the nodes. Next, the system generates a coloring for the nodes using two colors. The system then generates phase shifters for the phase-shifting mask and assigns different phases to the phase shifters based upon the coloring of the nodes.

In a variation of this embodiment, generating arcs between the nodes involves using a first type of arc and a second type of arc, and coloring the nodes involves ensuring that nodes connected by the first type of arc have the same color and that nodes connected by the second type of arc have a different color.

In a variation of this embodiment, associating nodes with features in the layout involves associating nodes with white spaces in the layout so that a graph created by adding arcs between the nodes is planar.

In a variation of this embodiment, generating arcs between the nodes involves assigning weights to arcs based upon the sizes and geometries of features associated with the nodes.

In a further variation, associating nodes with features in the layout involves: decomposing the layout into a plurality of edges, and creating zero or more nodes for each edge in the plurality of edges.

In a variation of this embodiment, creating zero or more nodes for each edge of the plurality of edges involves: creating zero nodes for feature ends; creating two nodes for a T-joint edge; and creating one node for remaining edges.

In a variation of this embodiment, the two colors include a first color that corresponds with a zero-degree phase shifter on the phase-shifting mask, and a second color that corresponds with a 180-degree phase shifter on the phase-shifting mask.

DETAILED DESCRIPTION

Integrated Circuit Features Including Edge Nodes

Figure 1:
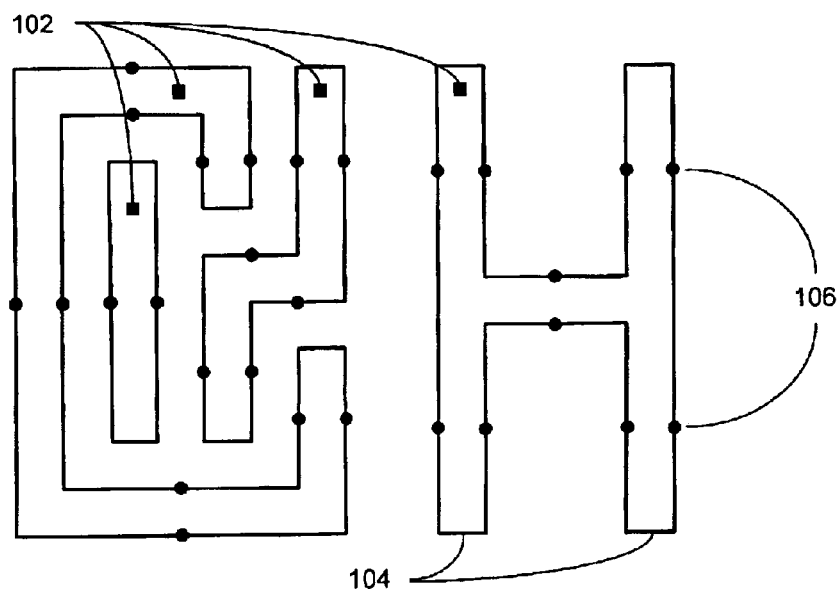
FIG. 1 illustrates features on an integrated circuit including associated nodes in accordance with an embodiment of the invention.

FIG. 1 illustrates features on an integrated circuit including associated nodes in accordance with an embodiment of the invention. During operation, the system receives integrated circuit features 102 in any acceptable format, such as GDSII stream format. The system decomposes the integrated circuit features 102 into a set of edges using any available feature decomposition system. The system then associates nodes with these edges. Typically, each edge is associated with one node. However, no node is associated with feature ends, such as ends 104, and two nodes are associated with edges that are part of a "T" structure as indicated by nodes 106.

White Space Nodes

Figure 2:
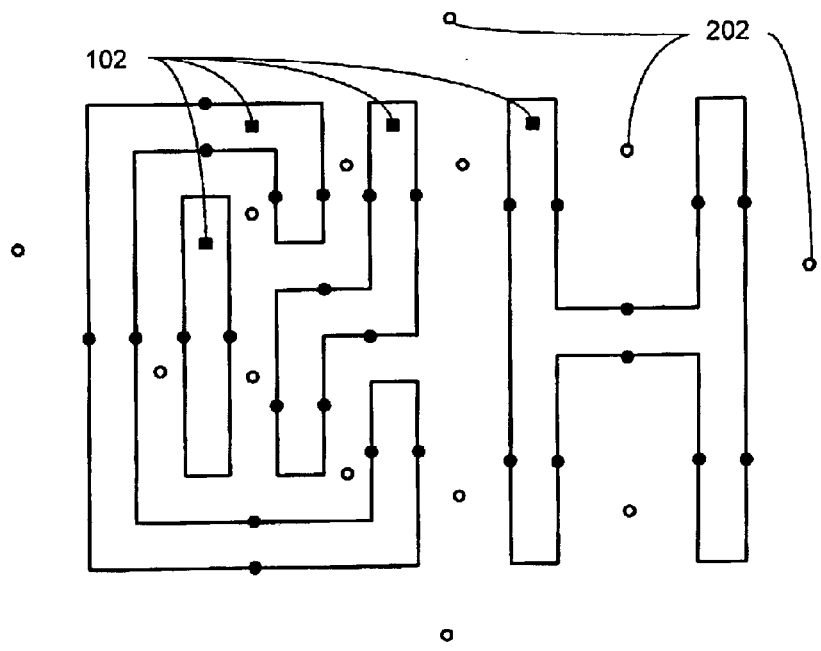
FIG. 2 illustrates features on an integrated circuit including associated white space nodes in accordance with an embodiment of the invention.

FIG. 2 illustrates integrated circuit features including nodes associated with white spaces in accordance with an embodiment of the invention. Integrated circuit features 102 are shown including nodes as described above. White space nodes 202 are added to facilitate creating a planar graph as described below in conjunction with FIGS. 3 and 4. This planar graph can be in the form of a Voronoi diagram or a Delaunay Triangulation. Voronoi diagrams and Delaunay Triangulation are well known in the art and will not be described further herein.

Non-planar Graph

Figure 3:
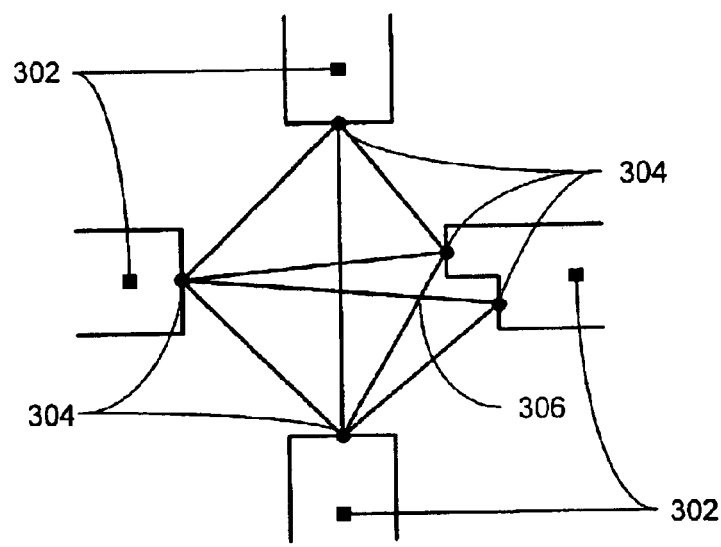
FIG. 3 illustrates a non-planar graph related to the integrated circuit features in accordance with an embodiment of the invention.

FIG. 3 illustrates a non-planar graph related to integrated circuit features in accordance with an embodiment of the invention. FIG. 3 illustrates integrated circuit features 302, including edge nodes 304. When arcs are added between nodes 304 to form a graph, some of the arcs cross each other as is illustrated at 306. Thus, the graph formed from these nodes is non-planar.

Planar Graph

Figure 4:
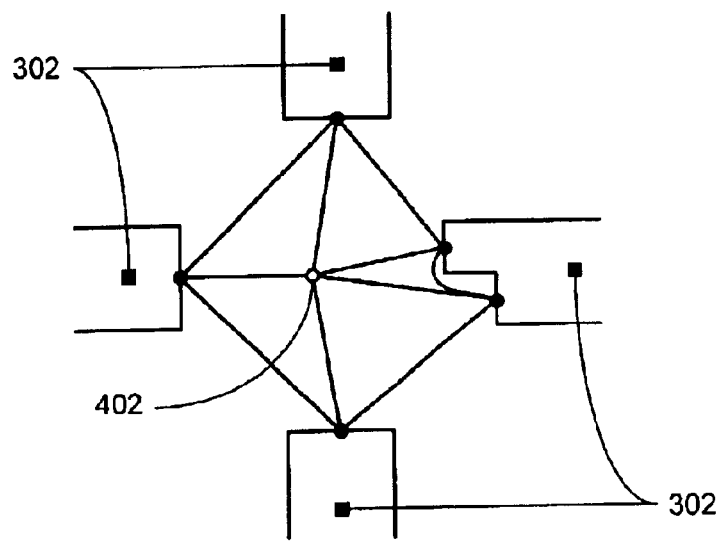
FIG. 4 illustrates a planar graph related to the integrated circuit features in accordance with an embodiment of the invention.

FIG. 4 illustrates a planar graph related to integrated circuit features in accordance with an embodiment of the invention. In FIG. 4, white space node 402 is added in the white space between integrated circuit features 302. After adding white space node 402, arcs can be added between the nodes, including white space node 402, to form a planar graph of the nodes.

Weighted Arcs

Figure 5:
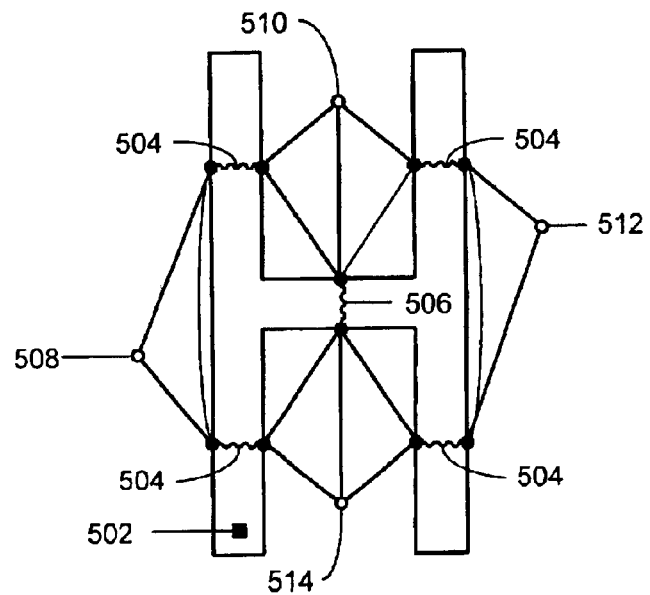
FIG. 5 illustrates weighted arcs between nodes in accordance with an embodiment of the invention.

FIG. 5 illustrates weighted arcs between nodes in accordance with an embodiment of the invention. In FIG. 5, integrated circuit feature 502 has an "H" shape and includes edge nodes as described above. White space nodes 508, 510, 512, and 514 have been associated with white spaces in the layout so that a planar graph can be formed using the edge nodes and the white space nodes. Note that a first type of arc is used to connect nodes that have different colors and a second type of arc is used to connect nodes that have the same color.

When generating arcs between nodes, arcs can be assigned different weights. For example, referring to FIG. 5, arcs 504, which connect nodes on opposite edges of a long, narrow "critical dimension" feature, are assigned a high weight. When colors are assigned to these nodes, the high weight of the arcs connecting the nodes causes these nodes to be assigned opposite colors. Arcs across wider features, or arcs on narrow features that are short can be assigned a medium weight. For example, in FIG. 5 arc 506 is assigned a medium weight because, although the feature is narrow, it is also short. A medium weight arc causes the corresponding nodes to be colored differently if possible without causing a conflict on nodes coupled by a high-weight arc. Arcs between other nodes, for example arcs between nodes 508, 510, 512, and 514 and their adjacent nodes can be assigned a low weight.

Phase-Shifting Masks

Figure 6:
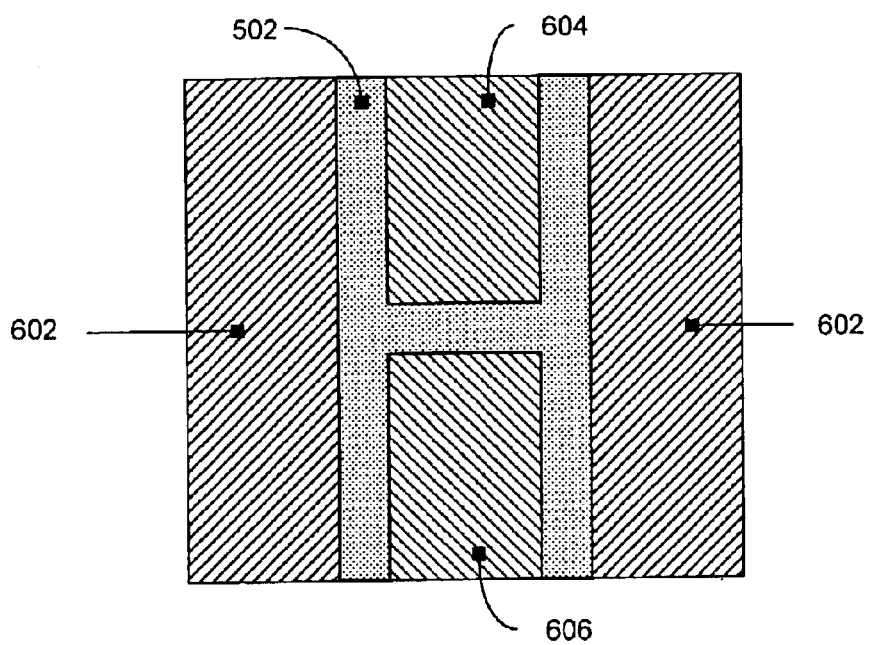
FIG. 6 illustrates phase-shifting masks in accordance with an embodiment of the invention.

FIG. 6 illustrates a phase-shifting mask in accordance with an embodiment of the invention. After the nodes have been colored as described above in conjunction with FIG. 5, a phase-shifting mask is created for the integrated circuit features. For example, integrated circuit feature 502 can be created using phase shifters 602 and 604 on a phase-shifting mask. Note that phase shifters 602 have a zero-degree phase, while phase shifters 604 and 606 have a 180-degree phase.

Phase shifters 602 and 604 have opposite phases which aids in defining the upper legs of the "H" pattern of integrated circuit feature 502. Moreover, phase shifters 602 and 606 have opposite phases which aids in defining the lower legs of the "H" pattern of integrated circuit feature 502. Also note that phase shifters 604 and 606, which form the horizontal bar of the "H" pattern, have the same phase. Having the same phase is undesirable in forming the horizontal bar of the "H" pattern, but may be acceptable since the horizontal bar of the "H" pattern is short. Otherwise, the phase shifters may have to be redesigned to provide a different phase for phase shifters 604 and 606. Techniques for redesigning the phase shifters are well known in the art and will not be discussed further herein.

Creating a Phase-Shifting Mask

Figure 7:
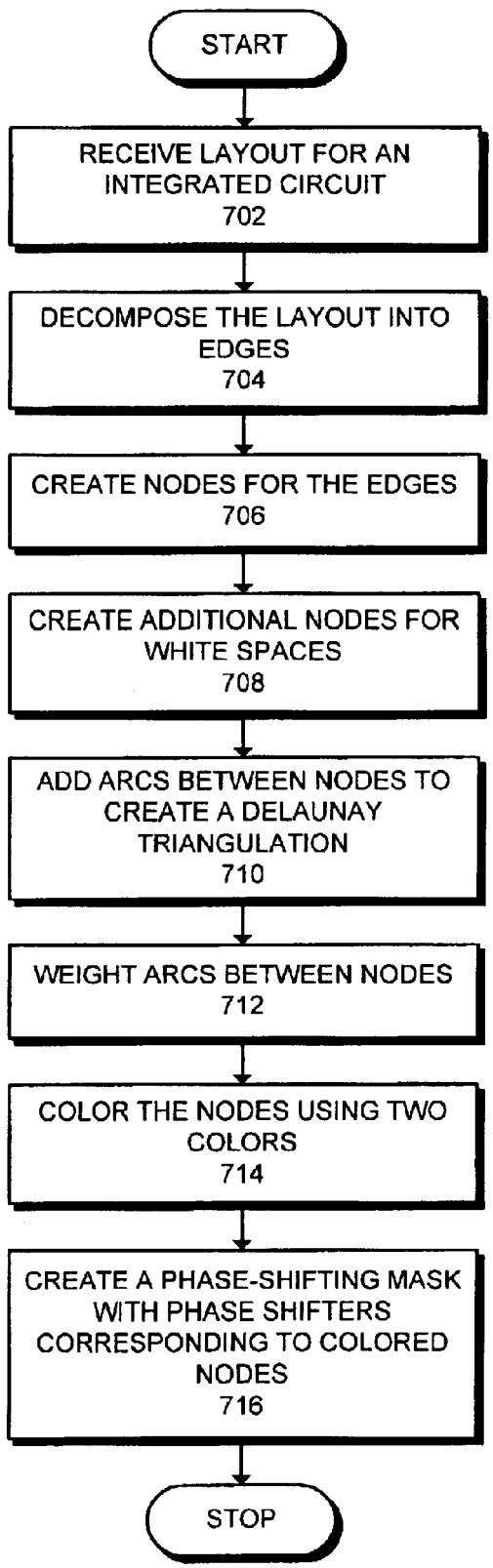
FIG. 7 presents a flowchart illustrating the process of creating a phase-shifting mask in accordance with an embodiment of the invention.

FIG. 7 is a flowchart illustrating the process of creating a phase-shifting mask in accordance with an embodiment of the invention. The system starts when a layout for the integrated circuit device is received (step 702). This layout can be in any acceptable format such as GDSII stream format. Next, the system decomposes the features of the layout into edges (step 704). This decomposition can be generated using any acceptable method of decomposition.

After the features have been decomposed into edges, the system creates nodes on the edges (step 706). During node creation, small edges, such as the ends of features do not receive any nodes and edges that are part of a "T" junction of features receive two nodes. All other edges receive a single node. Next, additional nodes are created in white space so that a planar graph can be created (step 708).

The system then adds arcs between the nodes using Delaunay triangulation or the Voronoi technique (step 710). Next, the system weights the arcs so that arcs across a feature with a critical dimension carry a high weight, while nodes on the same side of a feature carry a low weight (step 712).

The system assigns a two-color pattern to the nodes so that nodes connected a first type of arc have different colors and nodes connected by a second type of arc can be assigned the same color (step 714). Finally, the system creates a phase-shifting mask with phase shifters having phases that correspond to the colored nodes (step 716).

CONCLUSION

The foregoing description is presented to enable one to make and use the invention, and is provided in the context of a particular application and its requirements. It is not intended to be exhaustive or to limit the invention to the forms disclosed. Various modifications to the disclosed embodiments will be readily apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. Accordingly, many modifications and variations will be apparent. The scope of the invention is defined by the appended claims.

The data structures and code described in this detailed description can be stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Note that the invention can be applied to any type of lithographic process for fabricating semiconductor chips, including processes that make use of, deep-ultraviolet (DUV) radiation, extreme ultraviolet (EUV) radiation, X-rays, and electron beams, along with suitably modified masks.

What is claimed is:

1. A method for creating a phase-shifting mask for a photolithographic process used in fabricating an integrated circuit, comprising:

receiving a layout for the integrated circuit;

associating nodes with features in the layout, wherein associating nodes with feature in the layout involves: decomposing the layout into a plurality of edges, and creating zero or more nodes for each edge in the plurality of edges;

generating arcs between the nodes, wherein generating arcs between the nodes involves assigning weights to arcs based upon the sizes and geometries of features associated with the nodes, wherein arcs that connect nodes on opposite edges of a long, narrow feature are assigned a high weight, arcs across wider features and shorter features are assigned lower weights, and arcs between other nodes are assigned a lowest weight;

coloring the nodes using two colors; and generating phase shifters for the phase-shifting mask and assigning different phases to the phase shifters based upon the coloring of the nodes.

2. The method of claim 1, wherein generating arcs between the nodes involves using a first type of arc and a second type of arc; and wherein coloring the nodes using two colors involves ensuring that nodes connected by the first type of arc have the same color, and that nodes connected by the second type of arc have a different color.

3. The method of claim 1, wherein associating nodes with features in the layout involves associating nodes with white spaces in the layout so that a graph created by adding arcs between the nodes is planar.

4. The method of claim 1, wherein creating zero or more nodes for each edge of the plurality of edges involves:

creating zero nodes for feature ends;

creating two nodes for a T-joint edge; and creating one node for remaining edges.

5. The method of claim 1, wherein the two colors used to color the nodes includes:

a first color that corresponds with a zero-degree phase shifter on the phase-shifting mask; and a second color that corresponds with a 180-degree phase shifter on the phase-shifting mask.

6. A computer-readable storage medium storing instructions that when executed by a computer cause the computer to perform a method for creating a phase-shifting mask for a photolithographic process used in fabricating an integrated circuit, the method comprising:

receiving a layout for the integrated circuit;

associating nodes with features in the layout, wherein associating nodes with features in the layout involves: decomposing the layout into a plurality of edges, and creating zero or more nodes for each edge in the plurality of edges;

generating arcs between the nodes, wherein generating arcs between the nodes involves assigning weights to arcs based upon the sizes and geometries of features associated with the nodes, wherein arcs that connect nodes on opposite edges of a long, narrow feature are assigned a high weight, arcs across wider features and shorter features are assigned lower weights, and arcs between other nodes are assigned a lowest weight;

coloring the nodes using two colors; and generating phase shifters for the phase-shifting mask and assigning different phases to the phase shifters based upon the coloring of the nodes.

7. The computer-readable storage medium storing of claim 6, wherein generating arcs between the nodes involves using a first type of arc and a second type of arc; and wherein coloring the nodes using two colors involves ensuring that nodes connected by the first type of arc have the same color and nodes connected by the second type of arc have a different color.

8. The computer-readable storage medium storing of claim 6, wherein associating nodes with features in the layout involves associating nodes with white spaces in the layout so that a graph created by adding arcs between the nodes is planar.

9. The computer-readable storage medium storing of claim 8, wherein creating zero or more nodes for each edge of the plurality of edges involves:

creating zero nodes for feature ends;

creating two nodes for a T-joint edge; and creating one node for remaining edges.

10. The computer-readable storage medium storing of claim 6, wherein the two colors used to color the nodes includes:

a first color that corresponds with a zero-degree phase shifter on the phase-shifting mask; and a second color that corresponds with a 180-degree phase shifter on the phase-shifting mask.

11. A phase-shifting mask used in a photolithographic process for fabricating integrated circuits created by a process, comprising:

receiving a layout for the integrated circuit;

associating nodes with features in the layout wherein associating nodes with features in the layout involves: decomposing the layout into a plurality of edges, and creating zero or more nodes for each edge in the plurality of edges;

generating arcs between the nodes wherein generating arcs between the nodes involves assigning weights to arcs based upon the sizes and geometries of features associated with the nodes, wherein arcs that connect nodes on opposite edges of a long, narrow feature are assigned a high weight, arcs across wider features and shorter features are assigned lower weights, and arcs between other nodes are assigned a lowest weight;

coloring the nodes using two colors; and generating phase shifters for the phase-shifting mask and assigning different phases to the phase shifters based upon the coloring of the nodes.

12. The phase-shifting mask of claim 11,
wherein generating arcs between the nodes involves using a first type of arc and a second type of arc; and
wherein coloring the nodes using two colors involves ensuring that nodes connected by the first type of arc have the same color and nodes connected by the second type of arc have a different color.

13. The phase-shifting mask of claim 11, wherein associating nodes with features in the layout involves associating nodes with white spaces in the layout so that a graph created by adding arcs between the nodes is planar.

14. The phase-shifting mask of claim 11, wherein creating zero or more nodes for each edge of the plurality of edges involves:
creating zero nodes for feature ends;
creating two nodes for a T-joint edge; and
creating one node for remaining edges.

15. The phase-shifting mask of claim 11, wherein the two colors used to color the nodes includes:
a first color that corresponds with a zero-degree phase shifter on the phase-shifting mask; and
a second color that corresponds with a 180-degree phase shifter on the phase-shifting mask.

16. An integrated circuit created using a phase-shifting mask for a photolithographic process, the phase-shifting mask created by a process, comprising:
receiving a layout for the integrated circuit;
associating nodes with features in the layout, wherein associating nodes with features in the layout involves:
decomposing the layout into a plurality of edges, and
creating zero or more nodes for each edge in the plurality of edges;
generating arcs between the nodes, wherein generating arcs between the nodes involves assigning weights to arcs based upon the sizes and geometries of features associated with the nodes, wherein arcs that connect nodes on opposite edges of a long, narrow feature are assigned a high weight, arcs across wider features and shorter features are assigned lower weights, and arcs between other nodes are assigned a lowest weight;
coloring the nodes using two colors; and
generating phase shifters for the phase-shifting mask and assigning different phases to the phase shifters based upon the coloring of the nodes.

17. The integrated circuit of claim 16,
wherein generating arcs between the nodes involves using a first type of arc and a second type of arc; and
wherein coloring the nodes using two colors involves ensuring that nodes connected by the first type of arc have the same color and nodes connected by the second type of arc have a different color.

18. The integrated circuit of claim 16, wherein associating nodes with features in the layout involves associating nodes with white spaces in the layout so that a graph created by adding arcs between the nodes is planar.

19. The integrated circuit of claim 16, wherein creating zero or more nodes for each edge of the plurality of edges involves:
creating zero nodes for feature ends;
creating two nodes for a T-joint edge; and
creating one node for remaining edges.

20. The integrated circuit of claim 16, wherein the two colors used to color the nodes includes:
a first color that corresponds with a zero-degree phase shifter on the phase-shifting mask; and
a second color that corresponds with a 180-degree phase shifter on the phase-shifting mask.

21. A phase-shifting mask creation means for creating a phase-shifting mask for a photolithographic process used in fabricating integrated circuits, comprising:
a receiving means for receiving a layout for the integrated circuit;
an associating means for associating nodes with features in the layout, wherein associating nodes with features in the layout involves:
decomposing the layout into a plurality of edges, and
creating zero or more nodes for each edge in the plurality of edges;
an arc generating means for generating arcs between the nodes, wherein generating arcs between the nodes involves assigning weights to arcs based upon the sizes and geometries of features associated with the nodes, wherein arcs that connect nodes on opposite edges of a long, narrow feature are assigned a high weight, arcs across wider features and shorter features are assigned lower weights, and arcs between other nodes are assigned a lowest weight;
a coloring means for coloring the nodes using two colors; and
a phase shifter generating means for generating phase shifters for the phase-shifting mask and assigning different phases to the phase shifters based upon the coloring of the nodes.

22. The phase-shift mask creation means of claim 21,
wherein the arc generating means is further configured to generate arcs between the nodes involves using a first type of arc and a second type of arc; and
wherein the coloring means is further configured to color the nodes using two colors involves ensuring that nodes connected by the first type of arc have the same color and nodes connected by the second type of arc have a different color.

23. The phase-shift mask creation means of claim 21, wherein the associating means is further configured to associate nodes with features in the layout involves associating nodes with white spaces in the layout so that a graph created by adding arcs between the nodes is planar.

24. The phase-shift mask creation means of claim 21, wherein creating zero or more nodes for each edge of the plurality of edges involves:
creating zero nodes for feature ends;
creating two nodes for a T-joint edge; and
creating one node for remaining edges.

25. The phase-shift mask creation means of claim 21, wherein the two colors used to color the nodes includes:
a first color that corresponds with a zero-degree phase shifter on the phase-shifting mask; and
a second color that corresponds with a 180-degree phase shifter on the phase-shifting mask.

* * * * *

UNITED STATES PATENT AND TRADEMARK OFFICE
CERTIFICATE OF CORRECTION

PATENT NO. : 6,823,503 B2
DATED : November 23, 2004
INVENTOR(S) : Kevin A. Beaudette It is certified that error appears in the above-identified patent and that said Letters Patent is hereby corrected as shown below:

Column 6,
Line 36, please delete the words, "claim 8" and replace with the words -- claim 6 --.

Signed and Sealed this

Fifteenth Day of February, 2005

JON W. DUDAS
*Director of the United States Patent and Trademark Office*